(12) United States Patent
Hui

(10) Patent No.: US 8,709,245 B2
(45) Date of Patent: *Apr. 29, 2014

(54) POOL CLEANING VEHICLE HAVING SIDE VENTS AND DUCTS

(75) Inventor: Wing-kin Hui, Hong Kong (HK)

(73) Assignee: Smartpool LLC, Lakewood, NJ (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/153,394

(22) Filed: Jun. 4, 2011

(65) Prior Publication Data

US 2012/0305463 A1    Dec. 6, 2012

Related U.S. Application Data

(63) Continuation of application No. 12/273,536, filed on Nov. 18, 2008, now Pat. No. 8,012,345.

(51) Int. Cl.
*E04H 4/16*    (2006.01)

(52) U.S. Cl.
USPC .......................................... 210/167.17; 15/1.7

(58) Field of Classification Search
USPC ............... 210/167.15, 167.16, 167.17; 15/1.7
See application file for complete search history.

(56) References Cited

U.S. PATENT DOCUMENTS

| | | | |
|---|---|---|---|
| 2,725,356 A * | 11/1955 | Lombardi ..................... 210/805 |
| 2,919,027 A * | 12/1959 | Blumenfeld ............. 210/167.12 |
| 3,820,182 A * | 6/1974 | Vockrath ........................... 15/1.7 |
| 3,868,739 A * | 3/1975 | Hargrave .......................... 15/1.7 |
| 3,932,281 A * | 1/1976 | Pansini .......................... 210/163 |
| 4,100,641 A * | 7/1978 | Pansini ............................. 15/1.7 |
| 4,240,174 A * | 12/1980 | Thiem et al. .................... 15/1.7 |
| 4,649,589 A * | 3/1987 | Dibb ................................. 15/1.7 |
| 4,749,478 A * | 6/1988 | Brooks .................... 210/167.17 |
| 4,839,063 A * | 6/1989 | Brooks ......................... 210/780 |
| 5,028,321 A * | 7/1991 | Stone et al. ............. 210/167.17 |
| 5,337,434 A * | 8/1994 | Erlich ............................... 15/1.7 |
| 6,971,136 B2 | 12/2005 | Horvath et al. |
| 7,247,236 B2 * | 7/2007 | Desjoyaux et al. ........... 210/232 |
| 7,316,751 B2 * | 1/2008 | Horvath et al. ................. 134/21 |
| 2005/0247613 A1 * | 11/2005 | Bishop et al. ................. 210/169 |

* cited by examiner

*Primary Examiner* — Fred Prince

(74) *Attorney, Agent, or Firm* — Birch, Stewart, Kolasch & Birch, LLP

(57) ABSTRACT

Disclosed herein is an improved pool cleaning vehicle. The vehicle includes a housing, a bottom frame and a filter bag between the housing the bottom frame and attached to the bottom frame. The vehicle includes an intake system for causing water to enter the vehicle housing and to trap dirt and debris in the filter bag. The intake system includes more than one intake, which are typically mounted front and aft of the vehicle. The vehicle includes an outlet for flowing water passing through the filter bag back into the pool. Of course, both of the intake and outlet ports are in communication with the filter bag. The housing typically includes a bottom frame. Both the housing and the bottom frame have side openings defining vents, which serve as side intake ports. In an exemplary embodiment, the intake ports include a duct attached thereto. The duct has an open duct intake. In another exemplary embodiment, the front and/or aft intake port include a duct.

12 Claims, 3 Drawing Sheets

POOL CLEANING VEHICLE HAVING SIDE VENTS AND DUCTS

RELATED CASE INFORMATION

This application is a continuation under 35 USC 120 of U.S. application Ser. No. 12/273,536, filed on Nov. 18, 2008, now issued on Sep. 6, 2011 as U.S. Pat. No. 8,012,345 B2. The entire contents of the parent application are hereby incorporated by reference.

FIELD OF THE INVENTION

This invention generally relates to the field of automated pool products. More particularly, this invention relates to a submersible swimming pool vehicle, which includes the ability to clean the pool with side vent intake ports.

BACKGROUND OF THE INVENTION

It is now well accepted that pool cleaning devices, such as automated submersible pool cleaning vehicles are essential to the proper maintenance of a pool, whether the pool be above or below ground. The typical vehicle includes a housing, a bottom frame and a filtering bag held between the two. The vehicle includes intake and outlet ports. Typically, the ports are in the form of a free swinging door. Additionally, the vehicle includes a motor assembly for moving drive wheels and for creating at least a partial vacuum so that water will be encourage to enter the intake ports.

As the typical submersible automated pool cleaner moves along the surface of the pool while underwater, water flows into the intake port and through to the filter bag. The typical pool cleaning vehicle may include one motor for moving the vehicle and another motor which acts as a pump for creating a partial vacuum, encouraging water to enter the intake ports. The vacuum creates a suction force for accomplishing this task.

Upon entering the filter bag, dirt and debris is trapped therein. Water then exits the housing and re-enters the pool through an outlet port, which similarly communicates with the filter bag. The re-entering water is cleaner and has less dirt and debris than before entering the filter bag.

As is well known, such submersible automated pool cleaning vehicles travel submerged in water and randomly criss-cross the pool during cleaning. The width of the typical pool cleaning vehicle is no more than 20" and greater than 10". It will be appreciated that it takes the vehicle a substantial amount of time to clean the entire pool surface. If a pool cleaning vehicle were wider for example, it would need to make fewer passes and cleaner would take place relatively more efficiently. However, any increase in the width of the vehicle also likely increases the weight of the vehicle.

A pool cleaner cannot be heavier than its owner can lift fully submerged. Thus, if the vehicle becomes heavier than its owner can lift from the water, it becomes useless. Accordingly, it is an object of most pool cleaning devices to be as light as possible to assist the owner in removing the vehicle, fully submerged, from the water.

Thus, another avenue of solving the problem of creating a pool cleaning vehicle which is both lightweight and efficient must be found. Simply increasing the width of the vehicle is not a satisfactory solution.

Others have similarly recognized the problem of pool cleaning vehicle inefficiency. For example, Horvath et al, U.S. Pat. No. 6,971,136, discloses a high pressure water jet system for stirring up dirt and debris from the pool surface in hopes that the stirred up dirt and debris will be sucked into the housing and trapped in the filter bag. While this system may have some potential at more effective cleaning it does not solve the problem of increasing the effective cleaning width of the pool cleaning vehicle.

What is needed is a pool cleaning vehicle which increases the effective cleaning width of the vehicle, while maintaining a useable mass, so that the vehicle can be removed from the pool without an undue burden on its user.

SUMMARY OF THE INVENTION

The structure, in accordance with the present invention, is a pool cleaning vehicle, having side vents which define intake ports for sucking in pool water. The side intake ports communicate with the filter bag. The water brought into the filter bag this way can be treated and then released back into the pool, thus cleaning the pool water. In an exemplary embodiment, the side vents include a duct member which fits over the vent and extends the intake sideways and away from the vehicle. Another exemplary embodiment includes having such ducts on the existing front and rear intake ports. This also extends the effective cleaning width of the vehicle. The front and rear ducts also extend the intake ports sideways and away from the vehicle.

Thus, an object of an embodiment of the present invention is to provide a pool cleaning vehicle having the ability to filter dirt and debris at the intake and outlet ports of the vehicle and to extend the effective cleaning width of the vehicle.

It is another object of this invention to provide such a pool cleaning vehicle, where the existing ports include structure for extending the effective cleaning width of the vehicle in accordance with this invention.

It is an object of an embodiment of the present invention to provide such a pool cleaning vehicle, which extends the effective cleaning width of the pool cleaning vehicle without increasing the weight of the vehicle.

In accordance with the objects set forth above and as will be described more fully below, the pool cleaning vehicle in accordance with this invention, comprises:

a pool cleaning vehicle including a housing, a bottom frame and a filter bag between the housing and the bottom frame and intake ports in communication with the filter bag and including a motor connected to the vehicle intake ports for creating at least a partial vacuum for sucking water into the housing, the pool cleaning vehicle, comprising:

the vehicle having at least one side vent defining a side intake port, the side vent being in communication with the filter bag and and connected to the motor for creating suction;

a water outlet port also in communication with the filter bag for expelling filtered water into the pool; and the vehicle having additional intake ports, each of the ports being in communication with the filter bag.

In another exemplary embodiment of the pool cleaning vehicle in accordance with this invention includes at least one of the intake ports having a duct. The duct has an open end for causing pool water to flow into the duct. In another embodiment the open end is flow through and in other embodiments, the open end comprises a single open end distal of the housing and in the same plane as the bottom frame.

In still another exemplary embodiment of the pool cleaning vehicle in accordance with this invention, the front and/or rear intake ports include a duct member extending sideways and away from the vehicle.

Overall, the vehicle in accordance with this invention includes side vents and/or ducts extending sideways from existing intake ports which increase the effective cleaning width of the pool cleaning vehicle. It will be appreciated more fully hereinafter with respect to the Detailed Description that the combination of side vents and duct members are not fixed and the optimal combination can be done by trial and error until a satisfactory solution is reached.

It is an advantage of the pool cleaning vehicle in accordance with this invention to increase the effective cleaning width of the vehicle.

It is an additional advantage of the instant invention to provide such a vehicle, which remains no heavier than a usable weight, while increasing the effective cleaning width.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

In order to appreciate the invention herein, one must appreciate the need in the art as set forth in the Background. Most importantly, the structure herein for resolving the long felt need to increase the efficiency of the pool cleaning vehicle needed to be framed in terms of effectiveness as is represented by the structure in accordance with the disclosed invention. In fact, at least a portion of the invention is placing the need in terms where it could be resolved. Here, resolving the issue of what is effective pool cleaning width led to the resolution of the need for greater efficiency.

Figure 1:
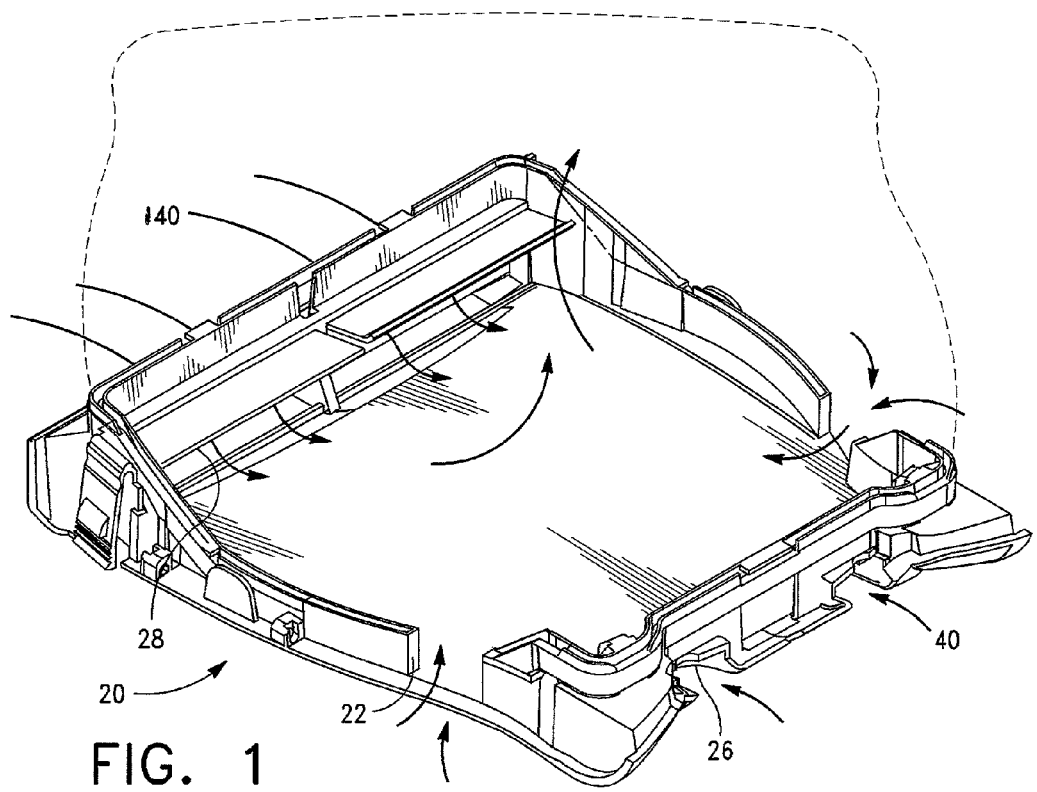
FIG. 1 is a perspective view of the bottom frame of the pool cleaning vehicle in accordance with this invention.

An exemplary embodiment of the bottom frame of a pool cleaning vehicle in accordance with this invention is shown in FIG. 1. As illustrated, the bottom frame is generally denoted by the numeral 20. As shown, the bottom frame has a side vent 22.

As shown in FIGS. 2-5, the vehicle includes a housing 30, drive wheels 32, front wheels 34 and a handle 36. Nominally, the front is labeled as 38 and the rear 140. However, it will be appreciated that the vehicle is capable of moving back and forth and defining a front or back is a relative term.

FIG. 1 also illustrates the front and rear intakes 26 and 28. These intakes are known in other pool cleaning vehicles. Using the disclosure of the instant invention, there will be described, with reference to FIG. 5, a structure for increasing the effective pool cleaning width.

Figure 2:
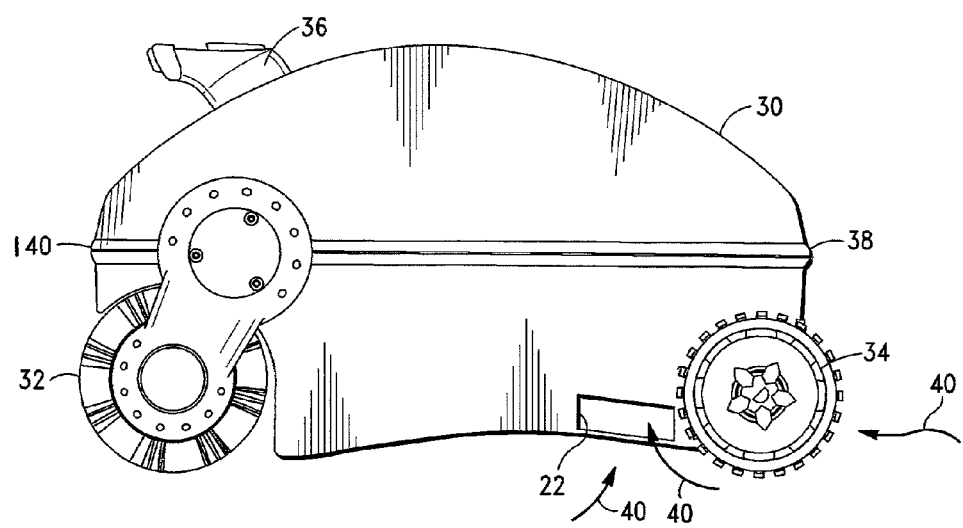
FIG. 2 is a side plan view of the pool cleaning vehicle in accordance with this invention illustrating side vents.

FIG. 2 illustrated the exemplary embodiment where the side vent 22 is located forward of center. It will be noted that the housing 30 has an opening defining the side vent 22. This housing opening, together with the bottom frame opening define the side vent 22. It will be appreciated, as is known in the art that the housing 30 is placed over the bottom frame 20 for an interlocking fit. The side openings of each of the housing 30 and the bottom frame 20 match so that the openings create and define the side vent 22.

As shown in FIGS. 1 & 2, the water follows the direction of the arrows 40. Thus, as shown, water flows into the interior of the housing 30 through each of the intake ports 26, 28, and 22.

Figure 3:
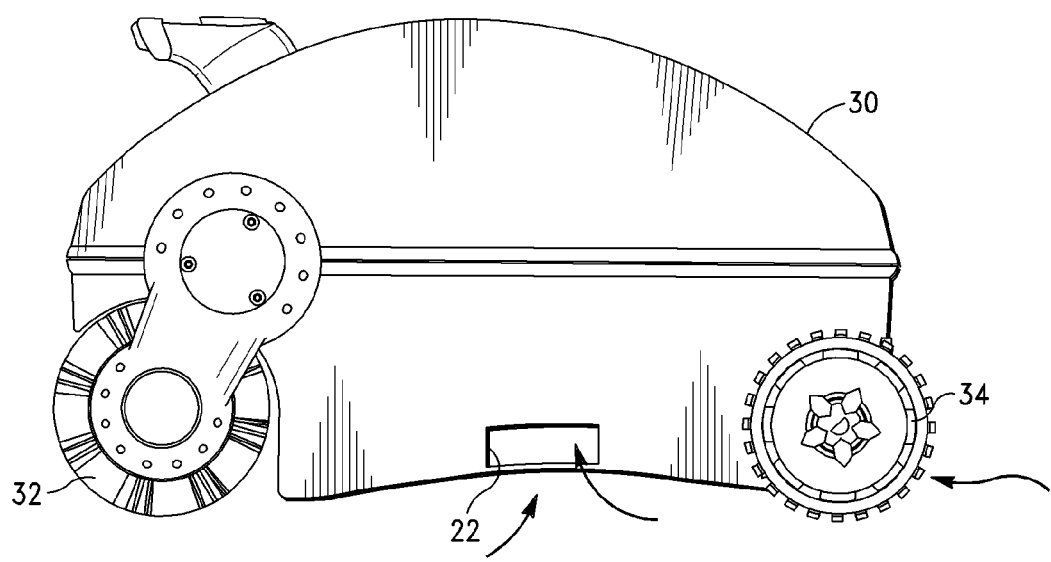
FIG. 3 is another exemplary embodiment of the pool cleaning vehicle in accordance with this invention illustrating central side vents.

With respect to FIG. 3, there is shown another exemplary embodiment of the pool cleaning vehicle in accordance with this invention. In this embodiment, the side vent 22 is centrally located on the side of the vehicle. The side vent 22 is approximately equidistance from the front and rear wheels, 34 and 32, respectively.

Figure 4:
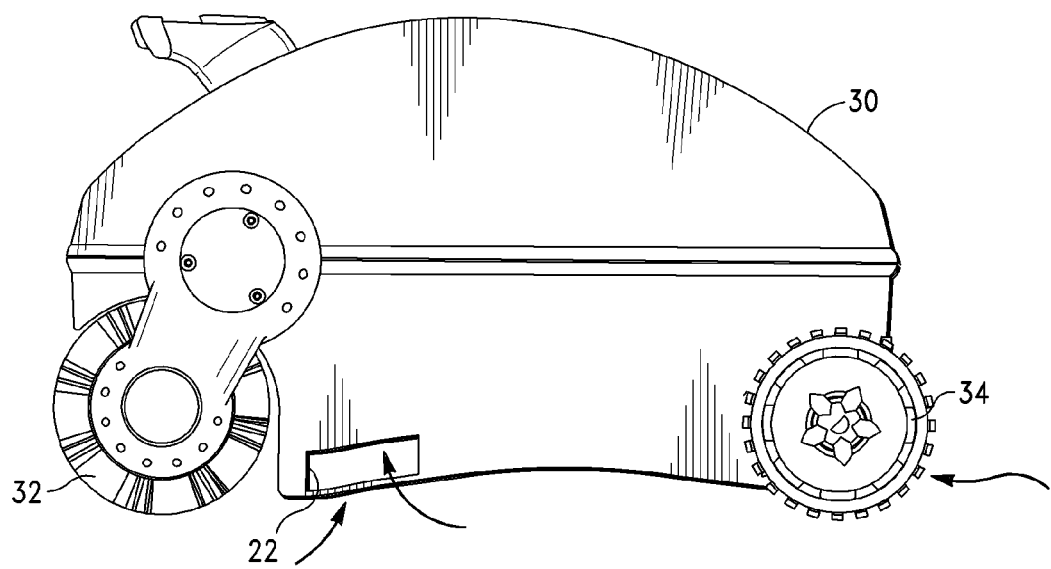
FIG. 4 is a side plan view of another exemplary embodiment of the pool cleaning vehicle in accordance with this invention.

With respect to FIG. 4, there is shown another exemplary embodiment of the pool cleaning vehicle in accordance with this invention. In this embodiment, the side vent 22 is centrally located proximate the rear of the vehicle. The side vent 22 is approximately equidistance from the front and rear wheels, 34 and 32, respectively.

Figure 5:
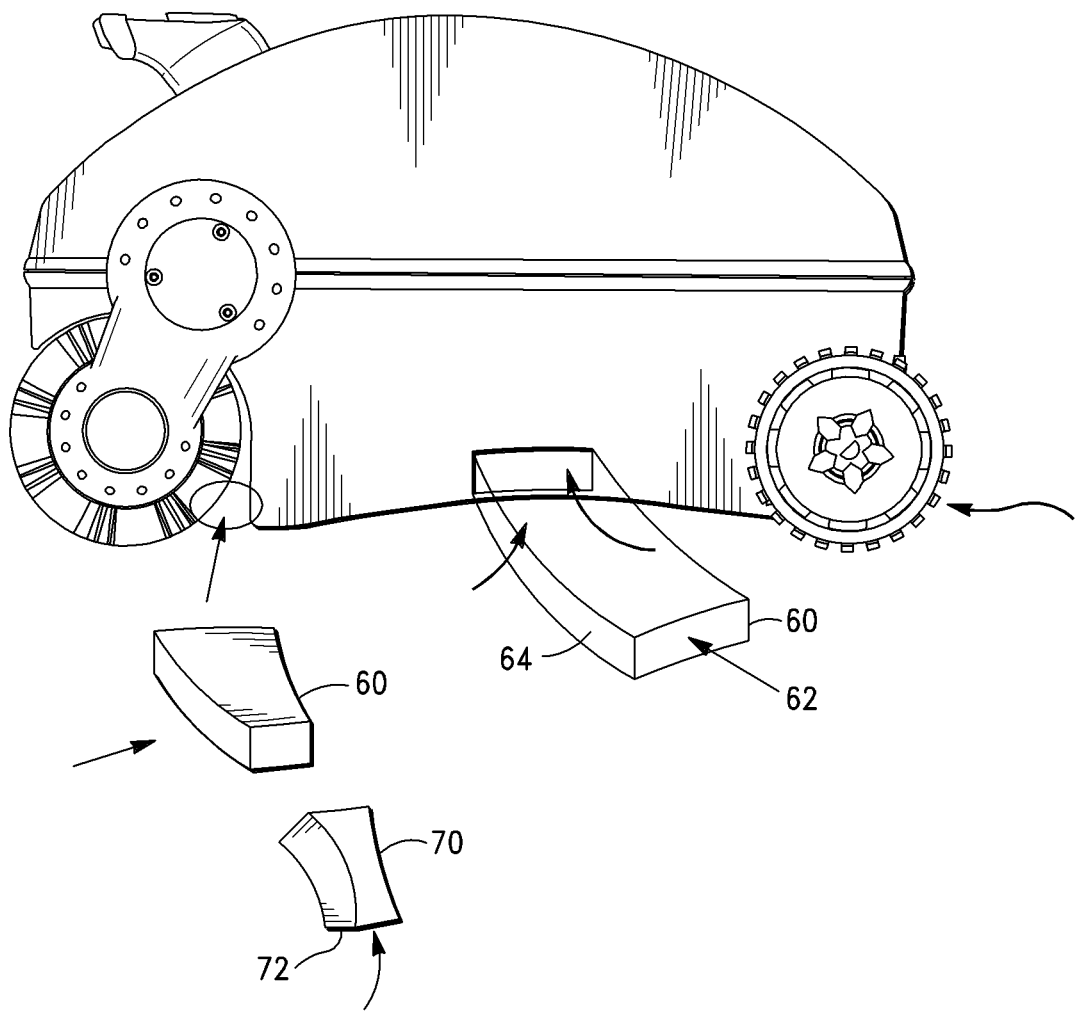
FIG. 5 is a side plan view of the pool cleaning vehicle in accordance with this invention illustrating the use of duct members.

With respect to FIG. 5, there is shown another exemplary embodiment of the vehicle in accordance with this invention. The vehicle exemplar herein includes a duct member 60. The duct member 60 is sized and shaped to fit over the side vent 22. The duct member 60 has an opening 62 for the inlet of water into the duct member 60.

In another embodiment of the duct member 60, the sides 64 of the duct member, either one or both create the inlet. In the embodiment where the duct member opening is on both sides of the duct member 60, a free flow inlet is defined.

In another embodiment, the duct member 60 fits over another of the intakes. In the embodiment shown in FIG. 5, the duct member 60 fits over the rear intake 28. The duct member 60 extends outwardly and towards the side of the vehicle. As described above, the duct member 60 has a variety of inlet types. Each of these inlet types are available for the duct member fitting over the front or rear intakes as well.

As shown in FIG. 5, the duct member 60 includes in another exemplary embodiment, the duct member includes a tip 70. The tip 70 fits over the open end of the duct member 60. The tip 70 has an open end 72. The open end 72 lies in the same plane as the bottom frame 20. In other words, the opening end 72 points downward toward the floor when the vehicle is generally flat. However, as the vehicle climbs walls or goes over an obstacle, the opening end 72 points in the direction of the pool surface as long as the bottom is directed to the pool surface.

While the foregoing detailed description has described several embodiments of the pool cleaning vehicle in accordance with this invention, it is to be understood that the above description is illustrative only and not limiting of the disclosed invention. Thus, the invention is to be limited only by the claims as set forth below.

What is claimed is:

1. A pool cleaning vehicle including a housing, a bottom frame and a filter bag between the housing and the bottom frame, the pool cleaning vehicle, comprising:
   at least one side vent defining a water inlet port, the side vent being in communication with the filter bag and a water outlet port also in communication with the filter bag;
   additional intake ports, each of said additional intake ports being in communication with the filter bag; and
   a motor operatively connected to the filter bag for selectively causing a suction from the side vent intake port and from the additional intake ports through the filter bag and out the water outlet port for filtering water disposed within the pool.

2. A pool cleaning vehicle as set forth in claim 1, wherein the side vent include a flow through duct intake.

3. The pool cleaning vehicle of claim 2, wherein the open intake has an outwardly extending duct, the duct being generally rectangular in shape and having an open duct intake.

4. The pool cleaning vehicle of claim 2, wherein the open intake has a single open end, located distally from the side vent when attached to the duct is attached to the vehicle and wherein the open end lies in the same plane as the bottom frame, generally pointed toward the pool surface during movement of the vehicle.

5. The pool cleaning vehicle of claim 4, wherein, the housing includes two sides and each side has more than one side vent.

6. The pool cleaning vehicle of claim 2, wherein the open intake is generally perpendicular to the direction of movement of the vehicle, defining an open front duct intake.

7. The pool cleaning vehicle of claim 2, wherein the bottom frame and housing both have side vents and when fully assembled the housing and bottom frame side frame match.

8. The pool cleaning vehicle of claim 1, wherein the vehicle has a rear intake port and the rear intake port includes a duct and wherein the duct extends towards the side of the vehicle and outwardly from the vehicle.

9. The pool cleaning vehicle of claim 1, wherein the vehicle has a front intake port and the front intake port includes a duct and wherein the duct extends towards the side of the vehicle and outwardly from the vehicle.

10. A pool cleaning vehicle including a housing, a bottom frame and a filter bag between the housing and the bottom frame and intake ports in communication with the filter bag and including a motor connected to the vehicle intake ports for creating at least a partial vacuum for sucking water into the housing, the pool cleaning vehicle e, comprising:
   at least one side vent defining a side intake port, the side vent being in communication with the filter bag and connected to the motor for creating suction;
   a water outlet port also in communication with the filter bag for expelling filtered water into the pool; and
   additional intake ports, each of said additional ports being in communication with the filter bag;
   said motor operatively connected to the filter bag for selectively causing a suction from the at least one side vent and from the additional intake ports through the filter bag and out the water outlet port for filtering water disposed within the pool.

11. The pool cleaning vehicle of claim 10, wherein the side vent is located proximate to the front of the vehicle.

12. The pool cleaning vehicle of claim 10, wherein the side vent is located approximately half way between the front and back of the vehicle proximate to the middle of the vehicle.

* * * * *